United States Patent
Kimura

(10) Patent No.: US 12,529,330 B2
(45) Date of Patent: Jan. 20, 2026

(54) CONTROL METHOD AND CONTROL DEVICE FOR INTERNAL COMBUSTION ENGINE

(71) Applicant: NISSAN MOTOR CO., LTD., Yokohama (JP)

(72) Inventor: Tamikazu Kimura, Kanagawa (JP)

(73) Assignee: NISSAN MOTOR CO., LTD., Yokohama (JP)

( * ) Notice: Subject to any disclaimer, the term of this patent is extended or adjusted under 35 U.S.C. 154(b) by 0 days.

(21) Appl. No.: 18/873,019

(22) PCT Filed: Jun. 10, 2022

(86) PCT No.: PCT/JP2022/023392
§ 371 (c)(1),
(2) Date: Dec. 9, 2024

(87) PCT Pub. No.: WO2023/238361
PCT Pub. Date: Dec. 14, 2023

(65) Prior Publication Data
US 2025/0354513 A1 Nov. 20, 2025

(51) Int. Cl.
*F01N 11/00* (2006.01)
*F01N 3/10* (2006.01)

(52) U.S. Cl.
CPC ............ *F01N 11/007* (2013.01); *F01N 3/101* (2013.01); *F01N 2560/14* (2013.01); *F01N 2900/0412* (2013.01); *F01N 2900/08* (2013.01); *F01N 2900/1411* (2013.01); *F01N 2900/1624* (2013.01)

(58) Field of Classification Search
CPC ................ F01N 3/101; F01N 11/007; F01N 2900/1411; F01N 2900/1624
See application file for complete search history.

(56) References Cited

U.S. PATENT DOCUMENTS

2013/0283783 A1    10/2013    Sato

FOREIGN PATENT DOCUMENTS

| CN | 109690039 B | * | 8/2021 | ............. F01N 3/101 |
| JP | H06-212955 A | | 8/1994 | |
| JP | 2001-329832 A | | 11/2001 | |
| WO | WO-2012/086078 A | | 6/2012 | |

\* cited by examiner

*Primary Examiner* — Ngoc T Nguyen
(74) *Attorney, Agent, or Firm* — Foley & Lardner LLP

(57) ABSTRACT

An internal combustion engine (1) has a three-way catalyst (15). An engine controller (9) has an oxygen amount calculation unit (102) determining an amount of oxygen flowing into the three-way catalyst (15) per unit time and an oxygen storage amount calculation unit (108) estimating a current oxygen storage amount by integrating positive and negative oxygen amount. A reference oxygen storage capacity calculation unit (107) outputs a reference oxygen storage capacity according to an intake air amount output by an intake air amount calculation unit (101) so that as the intake air amount is larger, the reference oxygen storage capacity becomes smaller. A catalyst diagnosis unit (104) judges catalyst deterioration by comparing a current oxygen storage capacity with the reference oxygen storage capacity set by taking the intake air amount into consideration.

6 Claims, 4 Drawing Sheets

CONTROL METHOD AND CONTROL DEVICE FOR INTERNAL COMBUSTION ENGINE

TECHNICAL FIELD

The present invention relates to a control method and a device for diagnosing deterioration of a three-way catalyst provided in an exhaust passage of an internal combustion engine on the basis of an oxygen storage capability of the three-way catalyst.

BACKGROUND ART

The three-way catalyst is capable of oxidizing CO and HC in exhaust gas and reducing (deoxidizing) NOx, but in order to achieve both these oxidation and reduction by catalytic action at a high level, the catalyst ability to occlude and release oxygen, i.e. the so-called oxygen storage capability, is important.

Here, the capacity of the three-way catalyst provided in the exhaust passage of the internal combustion engine for storing oxygen at the maximum, i.e. an oxygen storage capacity, decreases with deterioration (permanent deterioration and temporary deterioration) of the catalyst. Therefore, various techniques in which the oxygen storage capacity of the three-way catalyst is determined in some manner during operation of the internal combustion engine and the catalyst deterioration is diagnosed by the extent of decrease in this actual oxygen storage capacity from an initial oxygen storage capacity have been provided (for instance, Patent Document 1). The initial oxygen storage capacity to be compared is, as suggested in Patent Document 1, a value set corresponding to an initial state of the three-way catalyst, i.e. characteristics of a new three-way catalyst.

According to new findings of the present inventor, a substantial oxygen storage capacity of the three-way catalyst during operation is affected by a flow amount of gas flowing into the three-way catalyst. When the flow amount of the gas flowing through the three-way catalyst is large, a flow speed (or a flow rate) of the gas passing through a catalyst layer of the three-way catalyst increases, then as compared with a case where the gas flow amount is small, oxygen and NOx flow out to a downstream side at a stage where an oxygen storage amount is relatively small.

A conventional technique of Patent Document 1 etc. does not take account of change in the substantial oxygen storage capacity related to such gas flow amount, and when deterioration diagnosis is made under the operating condition of, e.g. the large gas flow amount, erroneous judgment tends to occur.

CITATION LIST

Patent Document

Patent Document 1: Japanese Unexamined Patent Application Publication No. JP2001-329832

SUMMARY OF THE INVENTION

A control method of an internal combustion engine according to the present invention, the internal combustion engine having a three-way catalyst in an exhaust passage and diagnosing catalyst deterioration based on decrease in an oxygen storage capacity of the three-way catalyst from a reference oxygen storage capacity, the method comprises: setting the reference oxygen storage capacity according to a flow amount of gas flowing into the three-way catalyst so that as this gas flow amount increases, the reference oxygen storage capacity decreases.

As described above, by setting the reference oxygen storage capacity so that as the gas flow amount into the three-way catalyst increases, the reference oxygen storage capacity decreases, decrease in a substantial oxygen storage capacity caused by increase in gas flow speed is cancelled (offset), then erroneous judgment in the deterioration diagnosis does not easily occur.

EMBODIMENTS FOR CARRYING OUT THE INVENTION

Figure 1:
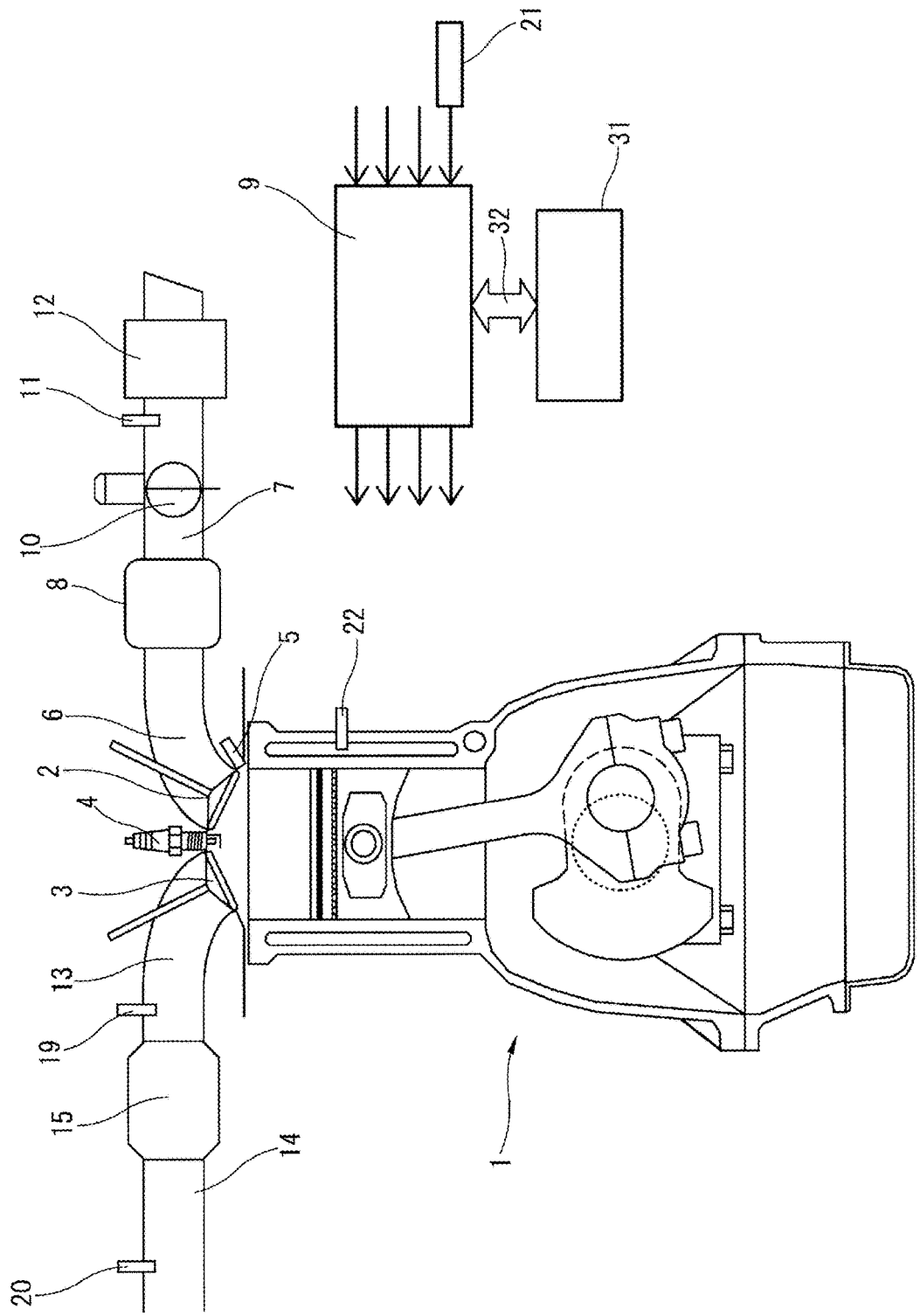
FIG. 1 is an explanatory drawing of a configuration of an internal combustion engine having a three-way catalyst according to an embodiment.

An embodiment of the present invention will be described in detail below with reference to the drawings. FIG. 1 is an explanatory drawing schematically showing a configuration of an internal combustion engine 1 to which this invention is applied, according to the embodiment. The internal combustion engine 1 of the embodiment is an engine used as a power generating internal combustion engine for driving, according to a power request, a power generating motor/generator that mainly operates as a power generator in a series hybrid vehicle. The internal combustion engine 1 is a four-stroke cycle spark-ignition internal combustion engine (a so-called gasoline engine). As an example, it is an inline three-cylinder engine, and an intake valve 2, an exhaust valve 3 and an ignition plug (a spark plug) 4 are provided for each cylinder. In the drawing, the internal combustion engine 1 is configured as a cylinder direct fuel injection internal combustion engine, and a fuel injection valve 5 injecting fuel toward an inside of the cylinder is arranged, for instance, at the intake valve 2 side. It is noted that the internal combustion engine 1 may have a configuration of a port-injection type in which fuel is injected toward an intake port 6.

An electronic control throttle valve 10 whose opening is controlled by a control signal from an engine controller 9 is arranged at an upstream side of a collector portion 8 in an intake passage 7 connected to the intake port 6 for each cylinder. An air flow meter 11 for detecting an intake air amount is arranged at an upstream side of the throttle valve 10, and an air cleaner 12 is arranged at a further upstream side.

An exhaust port 13 for each cylinder gathers as one exhaust passage 14, and a three-way catalyst 15 for cleaning engine emissions is provided in this exhaust passage 14. The three-way catalyst 15 is, for instance, a so-called monolithic ceramic catalyst in which a catalyst layer containing a catalyst metal is coated on a surface of a monolithic ceramic body having fine passages formed therein. Here, the three-way catalyst 15 may have a configuration having a plurality of catalysts (e.g. a manifold catalyst and an underfloor catalyst) arranged in series.

An upstream air fuel ratio sensor 19 for detecting an exhaust air fuel ratio is arranged at an inlet side of the three-way catalyst 15 in the exhaust passage 14, i.e. at a position on an upstream side with respect to the three-way catalyst 15 in the exhaust passage 14. This upstream air fuel ratio sensor 19 is a so-called wide-range air fuel ratio sensor that can obtain an output corresponding to the exhaust air fuel ratio. Further, a downstream air fuel ratio sensor 20 for responding to composition of the exhaust gas passing through the way catalyst 15 is arranged at a downstream side of the three-way catalyst 15 for calibration of an air fuel ratio feedback control system including the upstream air fuel ratio sensor 19, deterioration diagnosis of the three-way catalyst 15 etc. This downstream air fuel ratio sensor 20 may be, for instance, an 02 sensor, but as an example, a so-called wide-range air fuel ratio sensor is used, which is the same as the upstream air fuel ratio sensor 19.

Detection signals of the air fuel ratio sensors 19 and 20 and the air flow meter 11 are input to the engine controller 9. The engine controller 9 further inputs detection signals of a number of sensors such as a crank angle sensor 21 for detecting an engine rotation speed and a water temperature sensor 22 for detecting temperature of cooling water. The engine controller 9 optimally controls, based on these input signals, a fuel injection amount and an injection timing by the fuel injection valve 5, an ignition timing by the ignition plug 4, an opening of the throttle valve 10, etc. The engine controller 9 is connected to, via an in-vehicle network 32 such as CAN communication, an integrated controller 31 that controls the entire series hybrid vehicle including a travelling motor/generator etc. The engine controller 9 receives various requests or various commands including start and stop from the integrated controller 31.

Figure 2:
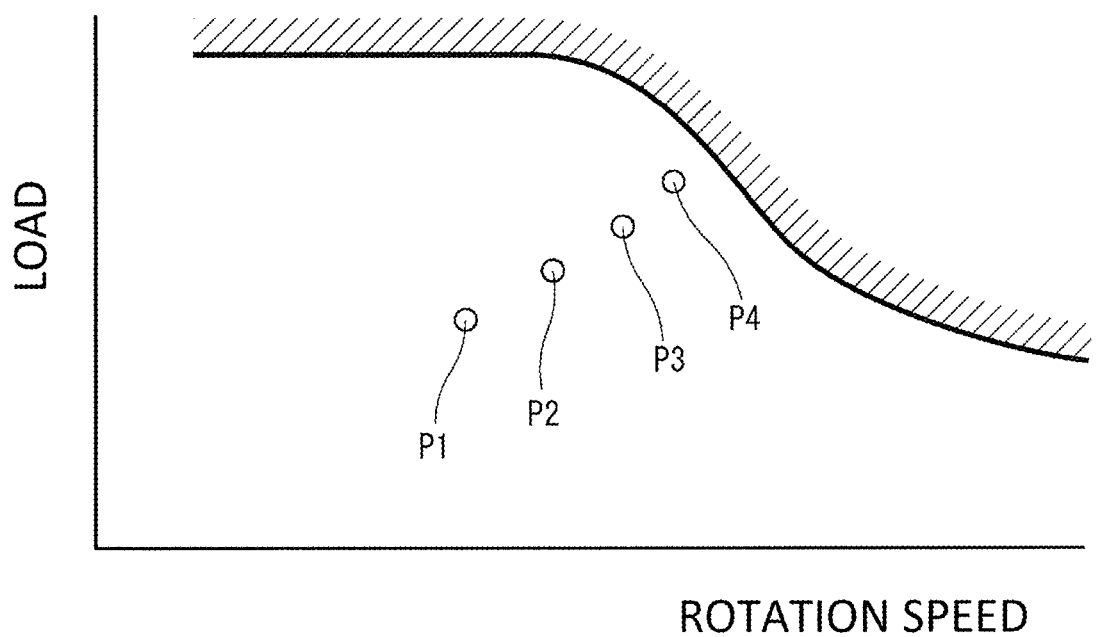
FIG. 2 is a characteristic diagram showing an example of operating points of the internal combustion engine according to the embodiment.

Since the internal combustion engine 1 of the embodiment is the power generating internal combustion engine in the series hybrid vehicle, the internal combustion engine 1 is basically started when an SOC of a vehicle travelling battery decreases, and as illustrated in FIG. 2, the internal combustion engine 1 is operated at some operating points (combination of load and rotation speed) determined according to magnitude of power generation request. For instance, four operating points P1 to P4 are shown in FIG. 2, and when the power generation request is relatively small, the internal combustion engine 1 is operated at the operating point P1 set close to the best fuel consumption point. As the power generation request becomes larger, the operating points P2, P3 and P4, which are located at a higher speed and higher load side, are selected. It is noted that each of these operating points is not strictly one point, but each point includes an appropriate range or region of the rotation speed and the load, although the range (or the region) is relatively narrow.

The engine controller 9 performs, as one of various controls of the internal combustion engine 1, an air fuel ratio control to optimize exhaust purification performance by the three-way catalyst 15. The air fuel ratio control is control that estimates an oxygen storage amount of the three-way catalyst 15 based on the exhaust air fuel ratio detected by the upstream air fuel ratio sensor 19, and feedback-controls the fuel injection amount (an injection pulse width) of the fuel injection valve 5 so that this oxygen storage amount becomes a target oxygen storage amount (as described later, this is set to a middle value of a reference oxygen storage capacity).

The engine controller 9 further performs the deterioration diagnosis of the three-way catalyst 15 during operation of the internal combustion engine 1. As mentioned above, a capacity of the three-way catalyst 15 for storing oxygen at the maximum, i.e. an oxygen storage capacity, decreases with deterioration (permanent deterioration and temporary deterioration) of the catalyst. Therefore, a current oxygen storage capacity of the three-way catalyst 15 is determined during operation of the internal combustion engine 1, and the catalyst deterioration can be diagnosed by the extent of decrease in this oxygen storage capacity from the reference oxygen storage capacity (for instance, which corresponds to an oxygen storage capacity which a new three-way catalyst 15 has). For instance, when the exhaust air fuel ratio at the downstream side of the three-way catalyst 15 detected by the downstream air fuel ratio sensor 20 is inverted (changed) from "lean" to "rich", the oxygen storage amount can be regarded to be 0. Conversely, when the exhaust air fuel ratio at the downstream side of the three-way catalyst 15 is inverted (changed) from "rich" to "lean", the oxygen storage amount can be regarded to be saturated. Therefore, from a relationship with the oxygen storage amount estimated based on the exhaust air fuel ratio detected by the upstream air fuel ratio sensor 19, the current oxygen storage capacity can be determined. Then, by comparing this current oxygen storage capacity with the reference oxygen storage capacity, a judgment as to whether the catalyst is deteriorated is made. For instance, if the current oxygen storage capacity is lower than the reference oxygen storage capacity by a predetermined percentage, it is judged that the catalyst is deteriorated.

Here, in the present embodiment, the reference oxygen storage capacity as a reference of the deterioration judgment is set with consideration given to a flow amount of gas flowing into the three-way catalyst 15. As mentioned above, a substantial oxygen storage capacity of the three-way catalyst 15 during operation is affected by the flow amount of the gas flowing into the three-way catalyst 15. When the flow amount of the gas flowing through the three-way catalyst 15 is large, a flow speed (or a flow rate) of the gas passing through the catalyst layer of the three-way catalyst 15 increases, then as compared with a case where the gas flow amount is small, oxygen and NOx flow out to a downstream side at a stage where the oxygen storage amount is relatively small. Therefore, if the reference oxygen storage capacity is fixedly set so as to correspond to the oxygen storage capacity of the new three-way catalyst 15 without taking this influence by the gas flow amount into consideration, erroneous judgment might occur when the gas flow amount is large which is a state in which the substantial oxygen storage capacity lowers.

In the present embodiment, the reference oxygen storage capacity is set according to the gas flow amount so that as the gas flow amount increases, the reference oxygen storage capacity decreases. Here, in the embodiment, as a parameter corresponding to the gas flow amount into the three-way catalyst 15, the intake air amount detected by the air flow meter 11 is used. "Intake air amount" is not an air amount per a cycle of the cylinder, but means a flow amount of air intaked into the internal combustion engine 1 (i.e. a flow amount of air passing through the air flow meter 11) per unit time.

Further, as one of the controls executed by the engine controller 9, a perturbation control for suppressing or eliminating temporary deterioration (also referred to as temporary poisoning) of catalytic performance of the three-way catalyst 15 is included. The perturbation control is control that periodically repeats rich combustion with large equivalence ratio and lean combustion with small equivalence ratio. For instance, in the internal combustion engine 1 having a plurality of cylinders, the rich combustion is performed N times in succession according to combustion order, subsequently, the lean combustion is performed N times in succession, then these are periodically repeated. The temporary deterioration of the catalyst is a phenomenon in which a catalyst metal surface area is reduced due to adhesion of oxygen, HC etc. to a catalyst metal surface, then the catalytic performance lowers. When an air fuel ratio of gas coming into contact with the catalyst is periodically changed relatively widely, poisoning substances covering the catalyst metal surface peel off, and the catalytic performance is recovered. It is noted that also during execution of such perturbation control, an average air fuel ratio is maintained close to a theoretical air fuel ratio.

As described above, although the internal combustion engine 1 of the embodiment is operated at the four operating points P1 to P4 shown in FIG. 2, the temporary deterioration of the catalyst tends to occur at the operating point P4 located at the highest speed and highest load side. Especially for use of the power generation for the series hybrid vehicle, operation at the same operating point continues for a relatively long time. Therefore, in the embodiment, when the internal combustion engine 1 is operated at the operating point P4, the perturbation control is executed in parallel. With this, the temporary deterioration of the catalyst is suppressed or eliminated.

It is noted that the perturbation control needs performing in a region in which conversion ratios of HC, CO and NOx in the three-way catalyst 15 are ensured. For instance, if a lean combustion time period (in other words, the number N of successive lean combustion) in the perturbation control is excessively long, the lean combustion is performed even after the oxygen storage amount of the three-way catalyst 15 is saturated, and as a consequence, NOx flows out to a downstream of the three-way catalyst 15. Likewise, if a rich combustion time period (in other words, the number N of successive rich combustion) in the perturbation control is excessively long, the rich combustion is performed even after the oxygen storage amount of the three-way catalyst 15 becomes 0, and as a consequence, HC etc. flow out to the downstream of the three-way catalyst 15. Therefore, in order that the conversion ratios do not lower at both of lean side and rich side, an optimum rich/lean variation cycle in the perturbation control is set according to the oxygen storage capacity of the new three-way catalyst 15. As described above, since the substantial oxygen storage capacity of the three-way catalyst 15 is affected by the magnitude of the flow amount of the gas flowing into the three-way catalyst 15, in the embodiment, the cycle of the rich/lean in the perturbation control is set based on the aforementioned reference oxygen storage capacity according to the gas flow amount into the three-way catalyst 15, i.e. the intake air amount. More specifically, when the gas flow amount is large and the reference oxygen storage capacity becomes a small value, the cycle is set to be relatively short. For instance, although the gas flow amount (the intake air amount) at the operating point P4 in FIG. 2 is large as compared with those at the other operating points P1 to P3, since the cycle in the perturbation control is set to a relatively short value based on the reference oxygen storage capacity at that time, the temporary deterioration can be eliminated while suppressing decrease in the conversion ratios caused by the excessively long rich combustion time period and the excessively long lean combustion time period as described above.

Figure 3:
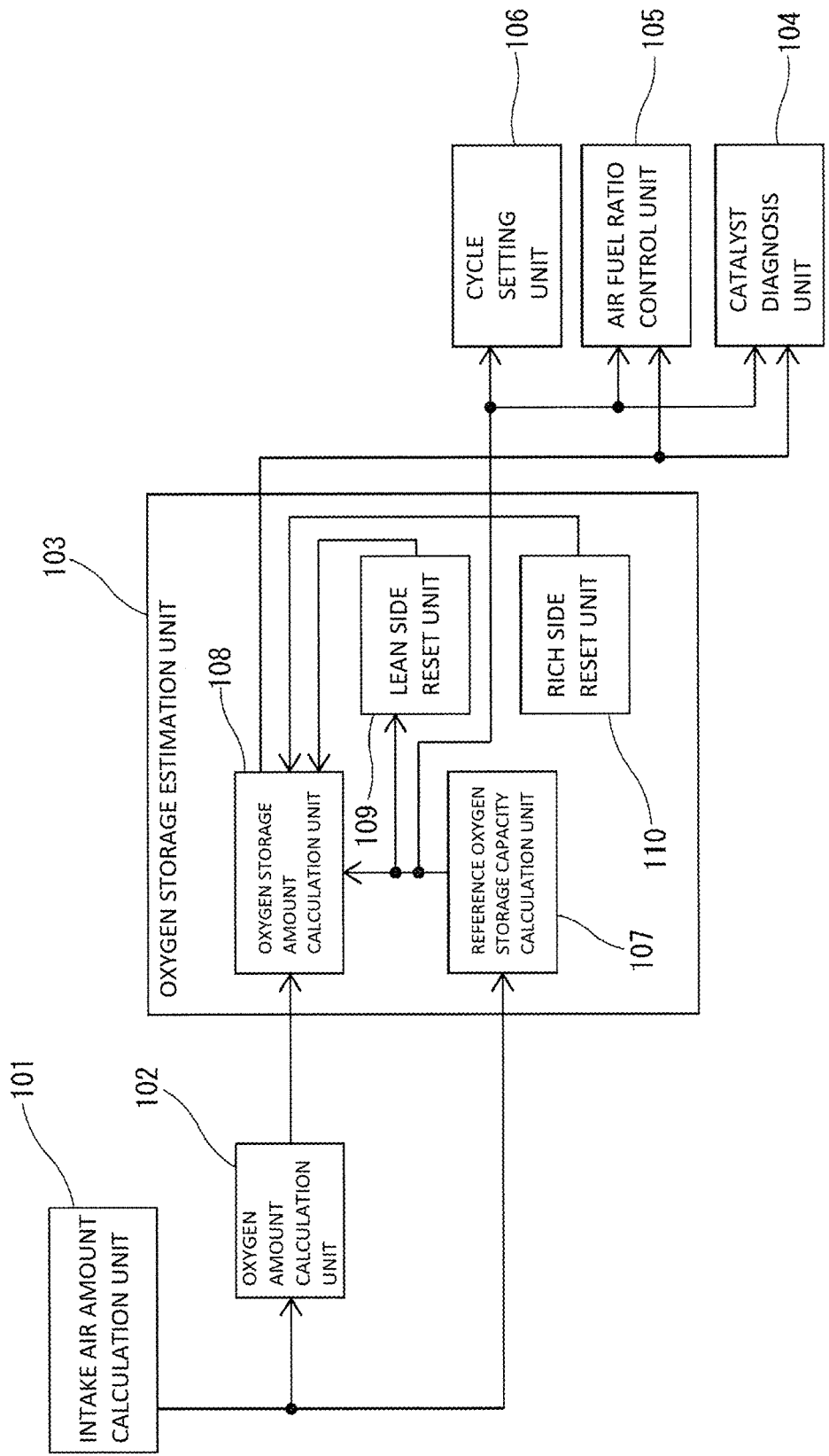
FIG. 3 is a functional block diagram of control according to the embodiment.

FIG. 3 is a functional block diagram of the control for the reference oxygen storage capacity according to the embodiment. The function shown in the block diagram is realized by software or hardware executed by the engine controller 9. As illustrated in the drawing, this functional block diagram includes an intake air amount calculation unit 101, an oxygen amount calculation unit 102, an oxygen storage estimation unit 103, a catalyst diagnosis unit 104, an air fuel ratio control unit 105 and a cycle setting unit 106. The oxygen storage estimation unit 103 has a reference oxygen storage capacity calculation unit 107, an oxygen storage amount calculation unit 108, a lean side reset unit 109 and a rich side reset unit 110.

The intake air amount calculation unit 101 calculates the intake amount of the air intaked into the internal combustion engine 1 based on the detection signal of the air flow meter 11. This intake air amount is regarded as the gas flow amount into the three-way catalyst 15 (the flow amount of the gas flowing into the three-way catalyst 15). The oxygen amount calculation unit 102 determines an amount of oxygen flowing into the three-way catalyst 15 per unit time based on the exhaust air fuel ratio detected by the upstream air fuel ratio sensor 19 and the gas flow amount into the three-way catalyst 15, i.e. the intake air amount. Here, the oxygen amount is given as both positive and negative values. That is, if the air fuel ratio is rich, the oxygen amount is a negative value. The oxygen storage amount calculation unit 108 calculates a current oxygen storage amount by integrating the oxygen amount per unit time output by the oxygen amount calculation unit 102. A value of this current oxygen storage amount is input to each of the catalyst diagnosis unit 104 and the air fuel ratio control unit 105.

Figure 4:
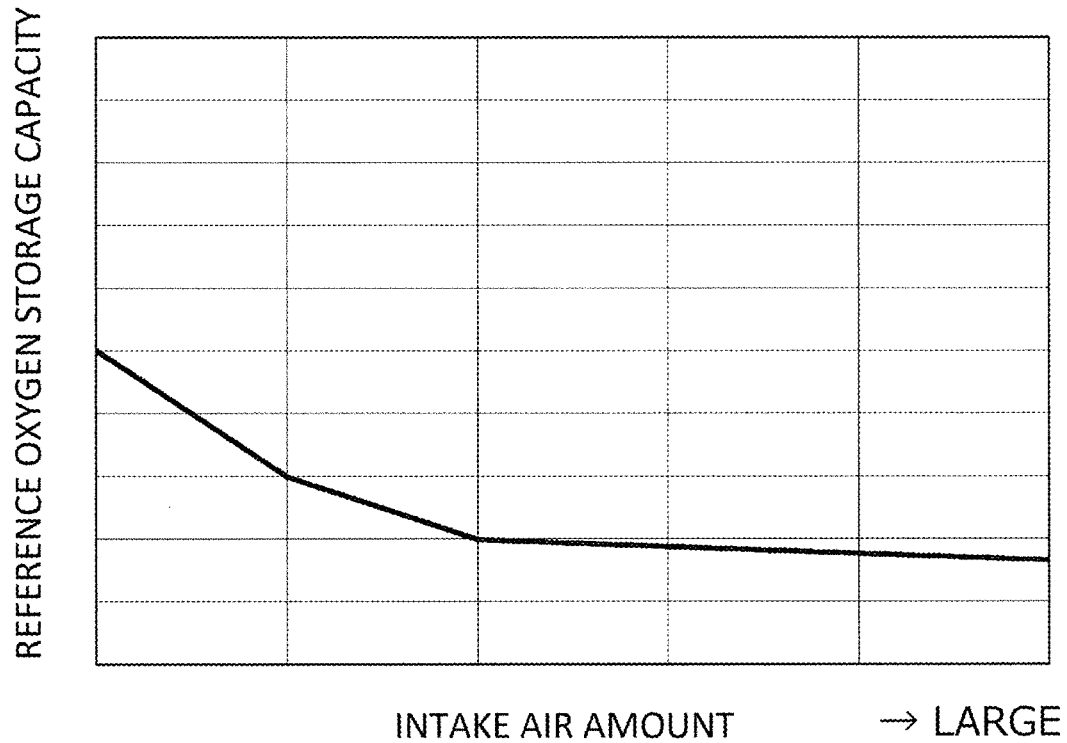
FIG. 4 is a characteristic diagram showing characteristics of a reference oxygen storage capacity with respect to an intake air amount.

The reference oxygen storage capacity calculation unit 107 determines the reference oxygen storage capacity according to the intake air amount (i.e. the gas flow amount into the three-way catalyst 15) output by the intake air amount calculation unit 101. In the embodiment, a map of characteristics as shown in FIG. 4 in which values of the reference oxygen storage capacity are given with the intake air amount being a parameter is provided. The reference oxygen storage capacity according to the intake air amount is determined using this map. As illustrated in FIG. 4, as the intake air amount increases, the reference oxygen storage capacity decreases.

Here, each of the oxygen storage amount and the reference oxygen storage capacity can be treated by a mass (unit "g") of oxygen. However, conventionally, the oxygen storage amount when the three-way catalyst 15 is new and also the gas flow amount is the minimum is set to 100(%), and each of the oxygen storage amount and the reference oxygen storage capacity can be expressed by percentage with respect to this oxygen storage amount. Therefore, when the intake air amount is the minimum, the reference oxygen storage capacity is 100(%), and as the intake air amount increases, the percentage decreases.

The value of the reference oxygen storage capacity determined in this manner by the reference oxygen storage capacity calculation unit 107 is given to the oxygen storage amount calculation unit 108 as an upper limit value. The oxygen storage amount output by the oxygen storage amount calculation unit 108 is limited by this upper limit value. That is, the oxygen storage amount estimated by the integration at the oxygen storage amount calculation unit 108 does not exceed the reference oxygen storage capacity set by taking the intake air amount into consideration.

Further, the value of the reference oxygen storage capacity determined by the reference oxygen storage capacity calculation unit 107 is input to each of the catalyst diagnosis unit 104, the air fuel ratio control unit 105 and the cycle setting unit 106.

The catalyst diagnosis unit 104 judges whether the catalyst is deteriorated by comparing the current oxygen storage capacity with the reference oxygen storage capacity as described above, but as the reference oxygen storage capacity to be compared, the value of the reference oxygen storage capacity set by taking the intake air amount into consideration is used. With this, erroneous judgment, e.g. when the gas flow amount into the three-way catalyst 15 is large, is suppressed.

The air fuel ratio control unit 105 sets the target oxygen storage amount in the air fuel ratio control using the reference oxygen storage capacity set by taking the intake air amount into consideration. For instance, a value of ½ of the reference oxygen storage capacity is set as the target oxygen storage amount. With this, the air fuel ratio control appropriate to an actual oxygen storage capacity changing depending on the gas flow amount can be realized.

The cycle setting unit 106 sets the aforementioned cycle of the rich/lean in the perturbation control based on the reference oxygen storage capacity according to the intake air amount. As the reference oxygen storage capacity is smaller, the cycle is set to be shorter. It is noted that when the perturbation control is performed only at one specific operating point (load and rotation speed), since the intake air amount can basically be one specific value, the cycle can be one fixed value.

The lean side reset unit 109 and the rich side reset unit 110 included in the oxygen storage estimation unit 103 reset, on the basis of the inversion of "lean" and "rich" of the detected air fuel ratio of the downstream air fuel ratio sensor 20, the current oxygen storage amount integrated or estimated by the oxygen storage amount calculation unit 108. For instance, the lean side reset unit 109 considers that when the detected air fuel ratio of the downstream air fuel ratio sensor 20 becomes lean, an oxygen storage capability of the three-way catalyst 15 is saturated, and resets the estimated value of the oxygen storage amount using the value of the reference oxygen storage capacity. Here, as the reference oxygen storage capacity, the reference oxygen storage capacity set by taking the intake air amount into consideration, which is output by the reference oxygen storage capacity calculation unit 107, is used. As an example, if the reference oxygen storage capacity set by taking the intake air amount into consideration is 90(%), the current oxygen storage amount regarded to be saturated is reset to 90(%). The rich side reset unit 110 considers that when the detected air fuel ratio of the downstream air fuel ratio sensor 20 becomes rich, the oxygen storage amount of the three-way catalyst 15 becomes 0, and resets the estimated value of the oxygen storage amount to 0. By providing such lean side reset unit 109 and rich side reset unit 110, accuracy of the oxygen storage amount estimated by the integration is improved.

Although the invention has been described above by reference to the embodiment of the invention, the invention is not limited to the embodiment described above, and various modifications can be made. For instance, in the above embodiment, as the parameter corresponding to the gas flow amount into the three-way catalyst 15 (the flow amount of the gas flowing into the three-way catalyst 15), the intake air amount is used. However, an exhaust gas flow amount may be calculated with consideration given to the combustion based on the intake air amount, or the exhaust gas flow amount in the exhaust passage (the flow amount of the exhaust gas flowing in the exhaust passage) might be detected by some means.

Further, the "intake air amount" in the above embodiment could be either a mass flow rate or a volume flow rate. For instance, the relationship between the target oxygen storage amount and the intake air amount as illustrated in FIG. 4 can be set in a form suitable for each of the mass flow rate and the volume flow rate.

Furthermore, in the above embodiment, as the example, the present invention is applied to the power generating internal combustion engine in the series hybrid vehicle. However, the present invention is not limited to the power generating internal combustion engine, but can be widely applied to an internal combustion engine that drives a vehicle.

Moreover, in the above embodiment, the perturbation control is always executed at a specific operating point. However, regardless of the operating point, the perturbation control may be performed when the temporary deterioration of the catalyst is detected or estimated.

In addition, in the above embodiment, the "reference oxygen storage capacity" is treated as a maximum oxygen storage capacity in which the oxygen storage amount is saturated under each intake air amount. However, in the present invention, as the "reference oxygen storage capacity", a threshold value itself whose magnitude is compared with that of the current oxygen storage capacity may be determined according to the intake air amount or the gas flow amount.

The invention claimed is:

1. A control method of an internal combustion engine, the internal combustion engine having a three-way catalyst in an exhaust passage for diagnosing catalyst deterioration based on decrease in an oxygen storage capacity of the three-way catalyst from a reference oxygen storage capacity, the method comprising:
    setting the reference oxygen storage capacity according to a flow amount of gas flowing into the three-way catalyst so that as the gas flow amount increases, the reference oxygen storage capacity decreases;
    estimating an oxygen storage amount of the three-way catalyst based on the gas flowing into the three-way catalyst; and
    when an air fuel ratio at a downstream side of the three-way catalyst is changed to lean, resetting an estimated value of the oxygen storage amount using the reference oxygen storage capacity set by taking the gas flow amount into consideration.

2. The control method of the internal combustion engine as claimed in claim 1, further comprising:
    treating a flow amount of air intaked into the internal combustion engine as the gas flow amount.

3. The control method of the internal combustion engine as claimed in claim 2, further comprising:
    determining the reference oxygen storage capacity from a table set with the flow amount of the air intaked into the internal combustion engine being a parameter.

4. The control method of the internal combustion engine as claimed in claim 1, further comprising:
    performing a perturbation control that periodically repeats rich and lean combustion in order to eliminate temporary deterioration of the catalyst; and setting a rich/lean variation cycle of the perturbation control based on the reference oxygen storage capacity set by taking the gas flow amount into consideration.

5. The control method of the internal combustion engine as claimed in claim 1, further comprising:
performing an air fuel ratio control so that an oxygen storage amount of the three-way catalyst becomes a target oxygen storage amount; and
setting the target oxygen storage amount based on the reference oxygen storage capacity set by taking the gas flow amount into consideration.

6. A control device of an internal combustion engine comprising:
a three-way catalyst provided in an exhaust passage of the internal combustion engine;
an upstream air fuel ratio sensor and a downstream air fuel ratio sensor provided at an upstream side and a downstream side of the three-way catalyst, respectively; and
a controller configured to control a fuel injection amount, wherein the controller is configured to diagnose catalyst deterioration based on decrease in an oxygen storage capacity of the three-way catalyst from a reference oxygen storage capacity, wherein the controller is configured to set the reference oxygen storage capacity according to a flow amount of gas flowing into the three-way catalyst so that as this gas flow amount increases, the reference oxygen storage capacity decreases, estimate an oxygen storage amount of the three-way catalyst based on the gas flowing into the three-way catalyst, and when an air fuel ratio at a downstream side of the three-way catalyst is changed to lean, reset an estimated value of the oxygen storage amount using the reference oxygen storage capacity set by taking the gas flow amount into consideration.

* * * * *